United States Patent [19]
Kleven

[11] Patent Number: 5,942,696
[45] Date of Patent: Aug. 24, 1999

[54] RAPID TRANSFER FUNCTION DETERMINATION FOR A TRACKING FILTER

[75] Inventor: Lowell A. Kleven, Eden Prairie, Minn.

[73] Assignee: Rosemount Inc., Eden Prairie, Minn.

[21] Appl. No.: 08/826,272

[22] Filed: Mar. 27, 1997

[51] Int. Cl.[6] ............................................. G01F 1/32
[52] U.S. Cl. ............................................. 73/861.22
[58] Field of Search ...................................... 73/861.22

[56] References Cited

U.S. PATENT DOCUMENTS

| | | | |
|---|---|---|---|
| 3,638,037 | 1/1972 | McMurtrie | 307/233 |
| 3,709,034 | 1/1973 | Herzl | 73/194 B |
| 3,719,080 | 3/1973 | Burgess | 73/194 B |
| 3,864,972 | 2/1975 | Burgess et al. | 73/861.22 |
| 4,270,391 | 6/1981 | Herzl | 73/861.22 |
| 4,545,258 | 10/1985 | Coursolle | 73/861.22 |
| 4,815,324 | 3/1989 | Tada et al. | 73/861.22 |
| 4,866,435 | 9/1989 | Frick | 340/870.16 |
| 4,893,035 | 1/1990 | Reynolds et al. | 307/520 |
| 5,309,771 | 5/1994 | Lew et al. | 73/861.22 |
| 5,351,556 | 10/1994 | Lew et al. | 73/861.22 |
| 5,372,046 | 12/1994 | Kleven et al. | 73/861.22 |
| 5,429,001 | 7/1995 | Kleven | 73/861.22 |
| 5,435,188 | 7/1995 | Lew et al. | 73/861.22 |

FOREIGN PATENT DOCUMENTS

| | | |
|---|---|---|
| 20 28 737 | 1/1970 | Germany . |
| 59 018421 | 1/1984 | Japan . |
| WO 95/06856 | 3/1995 | WIPO . |

OTHER PUBLICATIONS

Yehuda Avirav et al., IEEE Transactions on Instrumentation and Measurement, vol. 39, No. 5, Oct. 1990, "Implementation of Digital Signal Processing Techniques in the Design of Thermal Pulse Flowmeters", pp. 761–766.

Primary Examiner—George Dombroske
Assistant Examiner—Jewel Thompson
Attorney, Agent, or Firm—Westman, Champlin & Kelly, P.A.

[57] ABSTRACT

A vortex flowmeter senses a pressure of vortices in a flowing fluid and transmits an output related to mass flow. The vortex flowmeter includes a dynamic filter filtering the vortex pressure signal. The dynamic filter provides a first filtered output signal and a second filtered output signal. The dynamic filter includes a controllable transfer function. Control circuitry controls the controllable transfer function and provides an output related to mass flow as a function of the first filtered output signal and the second filtered output signal. Transmitter circuitry receives the output signal and transmits a signal related to mass flow.

16 Claims, 4 Drawing Sheets

RAPID TRANSFER FUNCTION DETERMINATION FOR A TRACKING FILTER

BACKGROUND OF THE INVENTION

The present invention has particular applications to flowmeters, such as vortex shedding meters or swirlmeters which are responsive to a fluid flow. The present invention relates to ascertaining a transfer function of a digital filter used in such meters and in other process instruments.

Flowmeters sense the flow of liquids or gasses in conduits and produce a signal indicative of the flow. Under certain circumstances, the presence of an obstacle known alternatively as a shedding bar, bluff body, or vortex generator, in a flow conduit causes periodic vortices in the flow. The frequency of these vortices is directly proportional to the flow velocity in the flowmeter. The shedding vortices produce an alternating differential pressure across the bluff body at the shedding frequency. This differential pressure is converted to an electrical signal by piezoelectric crystals or other differential pressure devices. The magnitude of the differential pressure or electric signal is proportional to $\rho V^2$, where $\rho$ is the fluid density and V is the fluid velocity. When the ratio of pipe diameter to the size of the bluff body is held constant, the signal magnitude is proportional to $\rho D^2 F^2$, where D is the inside diameter of the metering pipe and F is the shedding frequency. The vortex flowmeter produces pulses having a frequency proportional to the flow rate. In a swirlmeter, the fluid whose flow rate is to be measured is forced to assume a swirl component by means of swirl blades, the arrangement being such that the swirling motion is transformed into precessional movement to produce fluidic pulses which are sensed to yield a signal whose frequency is proportional to flow rate. See e.g., U.S. Pat. Nos. 3,616,693 and 3,719,080 which disclose examples of swirlmeters and are hereby incorporated by reference. As used herein "vortex flowmeter" shall include both vortex shedding meters and swirlmeters.

A vortex flowmeter can also calculate the mass flow rate through the pipe or conduit. U.S. Pat. No. 5,429,001 discloses a method and apparatus for calculating mass flow based upon amplitude and frequency of a filtered output. A filter in the vortex flowmeter receives an input signal related to flow having a fundamental frequency varying responsively to flow. The filter filters the input signal with a selected high pass (HP) filter characteristic and preset low pass (LP) filters to produce the filtered signal having a frequency representative of flow. The frequency characteristic of the HP filter is selected from a family of preselected HP filters having varying corner frequencies. Each HP filter in the family has a unique switch-up and a unique switch-down value assigned to it.

The vortex flowmeter disclosed in U.S. Pat. No. 5,429,001 also includes an adaptive response circuit which selects a current HP filter characteristic for use in the filter. The adaptive circuit uses one selection method when the flow is increasing and another selection method when the flow is decreasing. Calculation circuitry in the vortex flowmeter includes rectifying circuitry, summing circuitry, period counting and timing circuitry and a microprocessor. The rectifying circuit rectifies the filtered signal and the summing circuitry sums the magnitude of the rectified output while the period counting and timing circuitry counts periods and elapse time of the counted periods in the filtered output. The microprocessor calculates mass flow using the frequency and average amplitude of the filtered output based upon outputs from the summing circuitry, period counting circuitry and a system clock.

In a preferred embodiment, calculation of mass flow is corrected for error in the filtered output due to the transfer function of the digital filter. U.S. Pat. No. 5,429,001 discloses an equation of the frequency response transfer function for each of the individual filters. The microprocessor calculates mass flow using the filtered output signal with a correction factor due to the transfer function of each filter. However, since the transfer function varies due to changing corner frequencies provided by the microprocessor, the microprocessor must recalculate the transfer function of each filter in order to apply an accurate correction factor. Thus, for each calculation of mass flow rate, the microprocessor must perform many mathematical steps wherein each mathematical step requires a number of clock cycles. This limits the rate at which calculated mass flow rates can be provided, or limits what other functions the microprocessor can perform between calculated mass flow rates. It is, therefore, desirable to shorten the computational time necessary for the vortex flowmeter to compute the mass flow rate.

SUMMARY OF THE INVENTION

A vortex flowmeter senses a pressure of vortices in a flowing fluid and transmits an output related to mass flow. The vortex flowmeter includes a dynamic filter filtering the vortex pressure signal. The dynamic filter provides a first filtered output signal and a second filtered output signal. The dynamic filter includes a controllable transfer function. Control circuitry controls the controllable transfer function and provides an output related to mass flow as a function of the first filtered output signal and the second filtered output signal. Transmitter circuitry receives the output signal and transmits a signal related to mass flow.

Another aspect of the present invention includes a method for calculating an output related to flow rate from a vortex signal indicative of vortices generated in a fluid. The method includes the steps of: (a) filtering the vortex signal to provide a first filtered output signal; (b) filtering the first filtered output signal to provide a second filtered output signal; and (c) calculating the output related to flow rate as a function of the first filtered output signal and the second filtered output signal.

DETAILED DESCRIPTION OF THE PREFERRED EMBODIMENTS

Figure 1:
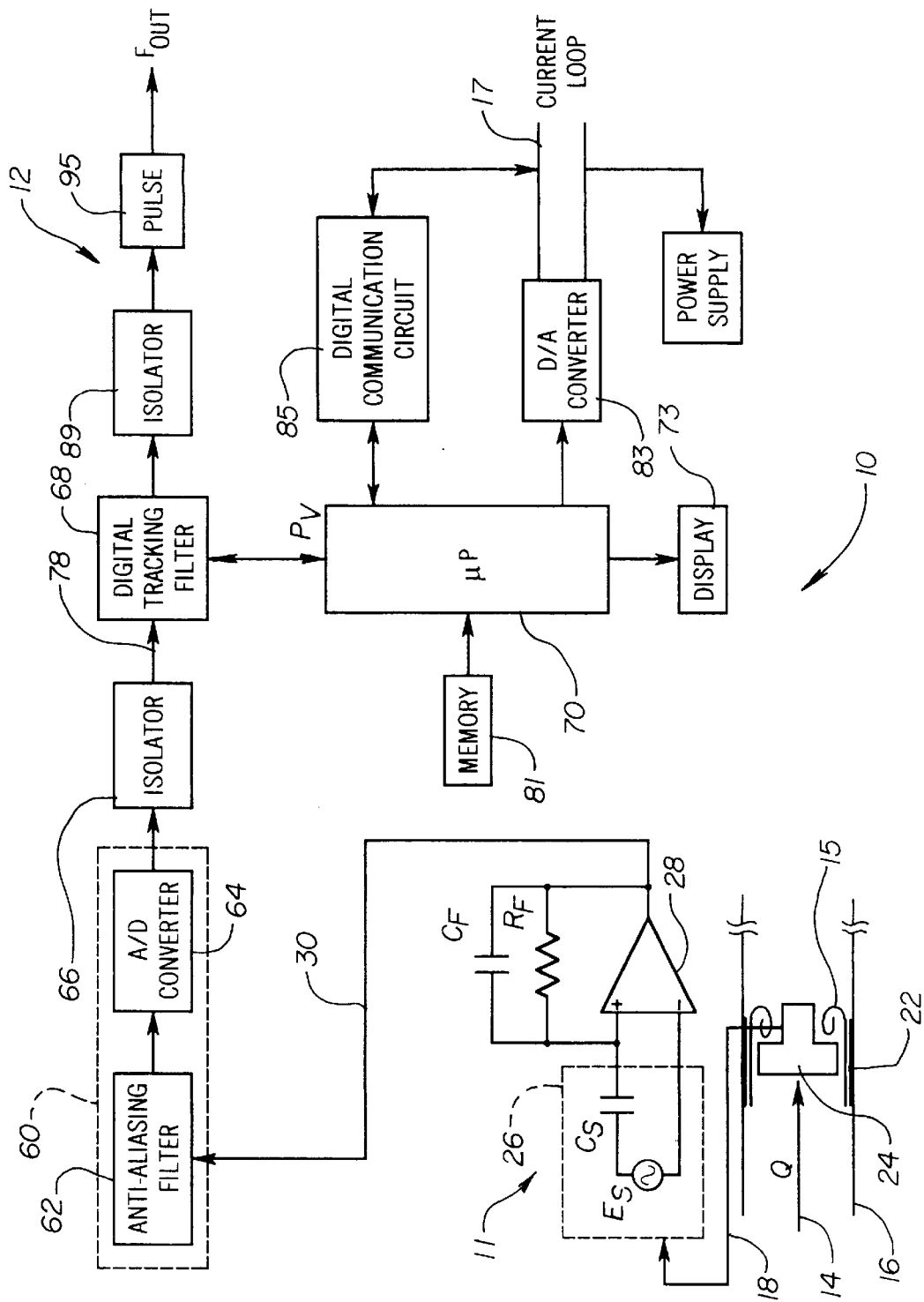
FIG. 1 is a block diagram of a vortex flowmeter in accordance with the present invention.

FIG. 1 illustrates an embodiment of a vortex flowmeter 10 of the present invention. Generally, the vortex flowmeter 10 includes a vortex sensor 11 that senses vortices 15 in a fluid 14 that flows through a conduit 16. The vortex sensor 11 is operably coupled to an electronic circuit 12. The electronic circuit 12 produces both a 4–20 mA current on a current loop 17 indicative of flow as well as a square wave output $F_{out}$ having a frequency proportional to fluid flow.

The vortex flowmeter 10 includes a vortex meter housing 22 having a bluff body 24 located therein. When the fluid 14 flows past the bluff body 24, shedding vortices 15 having a frequency indicative of the flow rate are produced. A vortex sensor 26 preferably located at the bluff body 24, senses a pressure difference associated with the shedding vortices 15. The vortex sensor 26 can include, for example, a piezoelectric sensor. The sensor 26 has characteristics approximated by a potential source $E_s$ and a series capacitor $C_s$. The magnitude of the output signal from the piezoelectric sensor 26 is proportional to the differential pressure, which is proportional to the $\rho V^2$, where $\rho$ is the fluid density and V is the velocity of the fluid 14, and also proportional to $\rho D^2 F^2$, where D is the inside diameter of the meter housing 22 and F is the shedding frequency of the vortices 15.

The output of the piezoelectric sensor 26 is coupled to an amplifier 28 which includes capacitor $C_F$ and a resistor $R_F$. The amplifier 28 provides an analog output signal on line 30. The signal on line 30 is provided to input circuitry 60 including an anti-aliasing filter 62 and an analog-digital (sigma-delta) converter indicated at 64. The anti-aliasing filter 62 filters the signal from line 30 to remove unwanted high-frequency noise and performs anti-aliasing filtering.

The analog-digital converter 64 samples the signal from filter 62 at approximately 307.2 kHz and outputs a single bit datastream at 307.2 kHz which is indicative of the amplitude and frequency of the vortices 15. There are no word boundaries in the datastream. The relative number of ones and zeros, sometimes called the bit density, is representative of the amplitude of the vortices 15. The analog-digital converter 64, which is preferably implemented in a CMOS ASIC to minimize power, cost, and size, is particularly suited to digitizing analog signals in the 1 to 10 kHz range, which is a typical frequency range for vortex flowmeters. The digital datastream is transmitted across an electrical isolation barrier 66 required for sensors which are grounded or have leakage current to ground. Such sensors are typically used in vortex flowmeters to reduce cost and simplify connections. The single bit datastream enables an inexpensive, compact transformer or capacitor to be used in the isolation barrier 66. Other isolation media are acceptable such as optical, piezoelectric/acoustic and magnetostrictive isolation means.

The single bit datastream is provided through the isolation barrier 66 to a digital tracking filter 68. The digital tracking filter 68 minimizes frequency quantization noise present in the analog-digital converter 64, and also converts the amplitude and frequency vortex sensor signal 30 into a flowmeter output indicative of mass flow. The digital filter 68 receives a noise-contaminated input signal related to flow having a fundamental frequency varying responsively to flow. The digital filter 68 filters the input signal with high pass (HP) filter characteristics and preset low pass (LP) filters to produce a filtered signal representative of flow. The frequency characteristic of the HP filter is selected from a family of preselected HP filters having different corner frequencies. In a preferred embodiment, multiple HP filters are used. A microprocessor 70 selects appropriate corner frequencies of the digital filter 68 or suitable control is provided in the digital filter 68 to select the corner frequencies. The digital filter 68 provides a signal related to the amplitude of the signal on line 30 and, which is roughly proportional to the density, $\rho_V$, of the fluid. The signal $\rho_V$ in turn is used to calculate the mass flow rate M. The $\rho_V$ signal is preferred over another signal $\rho_V$ also available from the digital filter 68 because the digital filter 68 has removed more noise from the $\rho_V$ signal.

The $\rho_V$ signal is received by the microprocessor 70. Preferably, the $\rho_V$ signal is corrected using a correction factor due to the transfer function of the digital filter 68. U.S. Pat. No. 5,429,001 describes equations used by the microprocessor 70 to calculate the transfer function. However, calculation of the equations by the microprocessor 70 consumes computational time.

In one aspect of the present invention, the vortex flowmeter 10 includes a digital filter 68 that receives the input signal 78 related to flow and provides filtered output signals which are used to calculate the transfer function of the digital filter 68.

Figure 2:
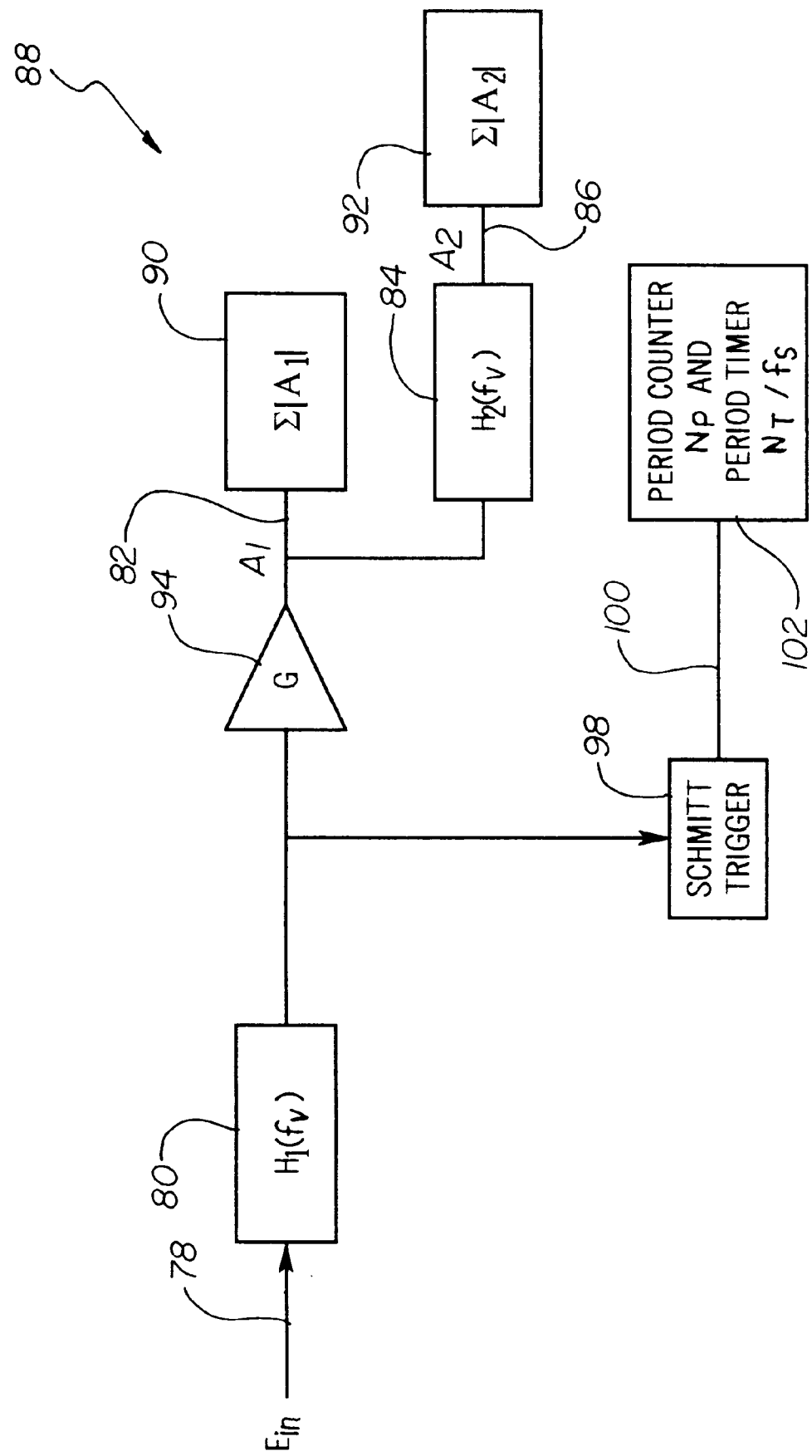
FIG. 2 is a simplified block diagram for obtaining signals for rapid calculation of a transfer function for a digital filter of the vortex flowmeter.

Referring to FIG. 2, the digital filter 68 includes a first filtering circuit 80 for receiving the input signal 78 related to flow. The first filtering circuit 80 filters the input signal 78 and provides a first filtered output signal 82. The first filtering circuit 80 is characterized by a first transfer function $H_1(f_V)$ wherein $f_V$ is the fundamental frequency of the input signal 78. A second filtering circuit 84 receives the first filtered output signal 82 and provides a second filtered output signal 86. The second filtering circuit 84 is characterized by a second transfer function $H_2(f_V)$, wherein the second transfer function $H_2(f_V)$ has a known relationship to the first transfer function $H_1(f_V)$. In a preferred embodiment, the first filtering circuit 80 and the second filtering circuit 84 are substantially identical, being implemented in a CMOS ASIC, such that the first transfer function $H_1(f_V)$ is substantially identical to the second transfer function $H_2(f_V)$.

A processing circuit 88 (FIG. 2) includes summing circuits 90 and 92. The summing circuit 90 receives the first filtered output signal 82, while the second summing circuit 92 receives the second filtered output signal 86. In the embodiment illustrated, the first filtered output signal 82 is amplified with the amplifier 94. The amplifier 94 comprises a multiplier where signal 82 is digital, and comprising an analog amplifier where the signal 82 is analog. The amplifier 94 is typically required for an integer system as disclosed herein in order that significant bits are not lost due to attenuation from the first filtering circuit 80. As described below, the processing circuit 88 calculates the output value representative of the flow rate of the flowing fluid, typically, the mass flow rate, as a function of the first filtered output signal 82 and the second filtered output signal 86.

Briefly, the basic equation describing the differential pressure caused by vortex shedding is:

$$E_{in} = V_o \sin(2\pi f_v t) \qquad \text{EQU. 1}$$

where $E_{in}$ is a sine wave signal input to the digital filter 68, $V_o$ is a numerical representation of signal amplitude, $f_V$ is the vortex shedding frequency (Hz) and t is elapsed time in seconds. The amplitude of the sensor signal, $V_o$ is proportional to the alternating differential pressure of the vortices 15 and can be used to determine mass flow and density $\rho_V$, as described below. The amplitude of the pressure signal $V_o$ on line 30 can be expressed as:

$$V_o = K_o \rho_V V^2 \qquad \text{EQU. 2}$$

where $K_o$ is a proportionality constant (influenced by sensor gain, charge amp gain, anti-alias filter gain, sigma-delta gain and flow effects) V is the velocity of the fluid and $\rho_V$ is as defined above.

The first filtered output signal ($A_1$) 82 and the second filtered output signal ($A_2$) 86 can be expressed as:

$$A_1 = GH_1(f_V)K_o\rho_V V^2 \sin(2\pi f_v t) \quad \text{EQU. 3}$$

$$A_2 = GH_1(f_V) H_2(f_V) K_o\rho_V V^2 \sin(2\pi f_v t) \quad \text{EQU. 4}$$

Using average amplitude to represent the first filtered output signal $A_1$ and the second filtered output signal $A_2$, the above equations can be written as:

$$\overline{A_1} = G\,\overline{H_1(f_V)}\, K_o\rho_V V^2 \quad \text{EQU. 5}$$

$$\overline{A_2} = G\,\overline{H_1(f_V)}\,\overline{H_2(f_V)}\, K_o\rho_V V^2 \quad \text{EQU. 6}$$

where, $$\overline{H_1(f_V)} \text{ and } \overline{H_2(f_V)}$$

denote average transfer functions.

Dividing Equation 6 by Equation 5 yields:

$$\frac{\overline{A_2}}{\overline{A_1}} = \overline{H_2(f_V)} = \overline{H_1(f_V)} \quad \text{EQU. 7}$$

Since the transfer functions $H_1(f_V)$ and $H_2(f_V)$ are equal, substituting the following:

$$\overline{A_1} = G\frac{\overline{A_2}}{\overline{A_1}} K_o\rho_V V^2 \text{ and } V = \frac{f_V}{K_f A_m} \quad \text{EQU. 8}$$

into Equation 5 yields:

$$M = \rho_V V A_m = \frac{\overline{A_1}^2 A_m^2 K_f}{\overline{A_2} K_o G F_V} \quad \text{EQU. 9}$$

where $F_V$ is the vortex shedding frequency, $k_f$ is the K factor (pulses per ft$^3$) and $A_M$ is the spool area (ft$^2$). Substituting the following:

$$\overline{A_1} = \frac{\Sigma|A_1|}{N_T}; \overline{A_2} = \frac{\Sigma|A_2|}{N_T}; F_V = \frac{N_p f_s}{N_T} \quad \text{EQU. 10}$$

into Equation 9 yields, the mass flow as:

$$M = \left[\frac{K_f A_m^2}{f_s K_o}\right] \times \left[\frac{1}{GN_p}\right] \times \left[\frac{(\Sigma|A_1|)^2}{\Sigma|A_2|}\right] \quad \text{EQU. 11}$$

where $N_p$ is the number of periods in the period interrupt to the processing circuit 88, $N_T$ is the number of timer counts at the sampling frequency, $f_S$, (30,720 Hz) $\Sigma|A_1|$ is the summation of magnitude of the amplitude values $A_1$ at the sampling frequency $f_S$ with $N_T$ equal to the number of samples in the period interrupt, and $\Sigma|A_2|$ is the summation of magnitude of the amplitude values $A_2$ at the sampling frequency $f_S$ with $N_T$ equal to the number of samples in the period interrupt. (Note that $N_T$ cancels out in Equ. 11.)

A Schmitt trigger 98 receives the first filtered output signal 82 and provides a square wave signal 100 at the vortex shedding frequency $f_V$ to provide the period counter $N_p$ and the period timer, $N_T/f_S$ indicated at 102.

In addition, $\rho_V$ is given by the following equation:

$$\rho_V = \left[\frac{K_f^2 A_m^2}{f_s^2 K_o}\right] \times \left[\frac{N_T}{GN_p^2}\right] \times \left[\frac{(\Sigma|A_1|)^2}{\Sigma|A_2|}\right] \quad \text{EQU. 12}$$

However, given actual density, $\rho_a$, $K_o$ can be calibrated as:

$$K_o = \frac{1}{\rho_a}\left[K_f^2 \frac{A_m^2}{f_s^2}\right] \times \left[\frac{N_T}{GN_p^2}\right] \times \left[\frac{(\Sigma|A_1|)^2}{\Sigma|A_2|}\right] \quad \text{EQU. 13}$$

Thus, by using two identical filtering circuits 80 and 84, a rapid determination of the transfer function of the filtering circuits 80 and 84 is obtained from the first and second filtered output signals 82 and 86 as shown by Equation 7.

Figure 3:
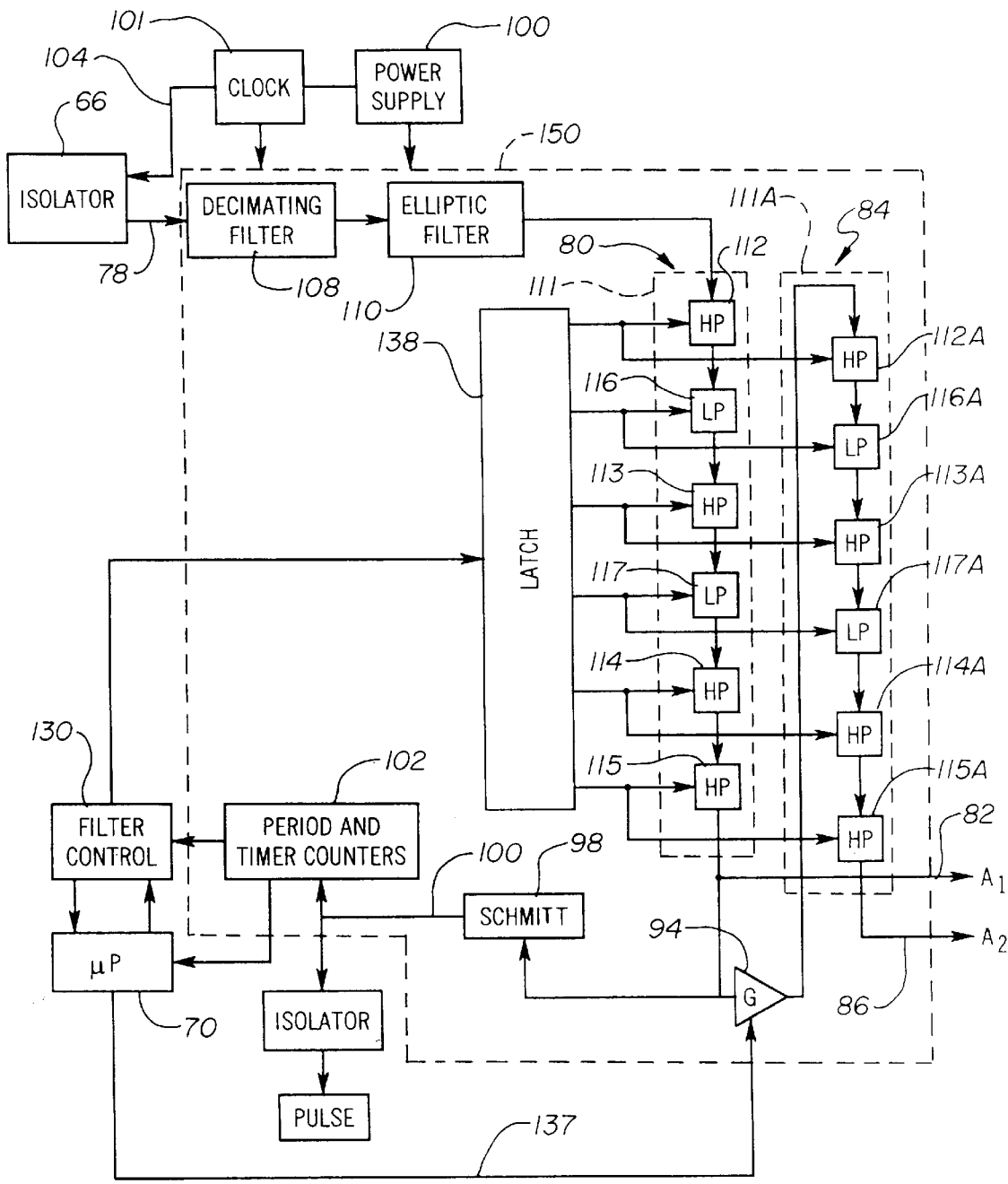
FIG. 3 is a block diagram of a portion of the vortex flowmeter in FIG. 1.

FIG. 3 illustrates an embodiment of the digital tracking filter 68. As stated above, the digital tracking filter 68 receives a single bit datastream 78 representative of the amplitude and frequency of the output of the vortex sensor 11 through the isolator 66. In the embodiment illustrated, a power supply 100 supplies power to a system clock 101 whose output signal 100 is passed through the isolator 66 to a power supply, not shown, which squares the clock signal and provides the square signal and power to the vortex sensor 11 and the input circuit 60 (FIG. 1). By using a common clock signal, synchronization is provided on both sides of the isolator 66.

A decimating filter 108 receives the serial bit datastream 78. The decimating filter 108 increases the width of the data word from one bit wide to ten bits wide and reduces the sampling frequency by a factor of ten to 30.72 kHz. The filter 108 reduces the amplitude of quantization noise and prevents aliasing of higher frequency signals caused by decimation. The decimation factor is chosen so that the decimation sampling rate is five to eight times greater than the highest frequency of the vortex signal in order to use simple digital filters in subsequent stages. An output signal of the decimating filter 108 is received by a LP infinite impulse response filter (IIR) (eliptic filter) 110 set to the approximate maximum operating frequency of vortex shedding. The elliptic filter 110 minimizes unwanted high frequency quantization noise present in the analog-digital converter 64 and sensor resonating frequency components. The decimating filter 108, described above, are not required when other methods of analog to digital conversion are used.

A cascaded filtering circuit 111 receives the output of the elliptic filter 110. The cascaded filtering circuit 111 includes serially cascaded filters in the following order: a high pass (HP) filter 112, a low pass (LP) filter 116, a HP filter 113, a LP filter 117, a HP filter 114, and then a HP filter 115. Each filter digitally approximates a single pole low pass filter or a single pole high pass filter. An analog implementation of the cascaded filtering circuit 111 would also use two LP filters and four HP filters, each having a single pole. HP and LP filters 112–117 are cascaded in this fashion to reduce transients caused when HP filter characteristics are switched by the microprocessor 70, since HP filter transients have high frequency components which are not attenuated by succeeding HP filters. Otherwise, the digital equivalent of the Schmitt trigger 98 may produce undesired extra output pulses. By interleaving the HP and LP filters 112–117, this transient effect is attenuated sufficiently to substantially eliminate the effect. The Schmitt trigger 98 receives the output of the filter 115 which generates a square wave vortex signal 124 having substantially the same frequency as the frequency of the output of the vortex sensor signal 30. The period timer and period counter 102 provide the elapsed time since a last period boundary of the signal 100 to a filter control 130, and the time between period boundaries of the signal 100. The filter control 130 operates as described in U.S. Pat. No. 5,429,001, which is herein incorporated by reference, wherein the filter control 130 receives switch up and switch down values corresponding to each of a plurality of preselectable HP filter characteristics from the microprocessor 70. The filter 130 also recognizes which HP filter characteristic is currently used in each of the HP filters 112–115.

The microprocessor 70 calculates appropriate corner frequencies for the filters 112–115 and sends corner selection commands representative of the proper HP filter characteristic to the filter control 130 and, in turn, to a filter selection latch 138. The latch 138 distributes filter selection values to the filters 112–115. The output signal from the filter 115 is the first filtered output signal 82 ($A_1$). The first filtered output signal 82 is preferably amplified with the amplifier 94 and provided to a second cascaded filtering circuit 111A. The amplifier 94 is typically required for an integer system as disclosed herein in order that significant bits are not lost due to attenuation from the LP filters 116 and 117. Preferably, the gain of amplifier 94 is adjustable to keep the numbers within the desired numeric range without a loss of significant digits or overflow. The microprocessor 70 adjusts the amplifier 94 when necessary through control signal 137.

The second cascaded filtering circuit 111A is substantially identical to the cascaded filtering circuit 111 wherein filters 112A–117A correspond to filters 112–117, respectively. As illustrated, the second cascaded filtering 111A is controlled in accordance with the cascaded filtering circuit 111 since the second cascading filtering circuit 111A receives the same control signals from the latch 138. The filter 115A provides the second filtered output signal 86 ($A_2$). It is preferable to implement the cascaded filtering circuits 111 and 111A into an ASIC to obtain substantially identical transfer functions. Dashed box 150 indicates other circuitry that is preferably implemented into the ASIC to conserve power and for ease of assembly.

Figure 4:
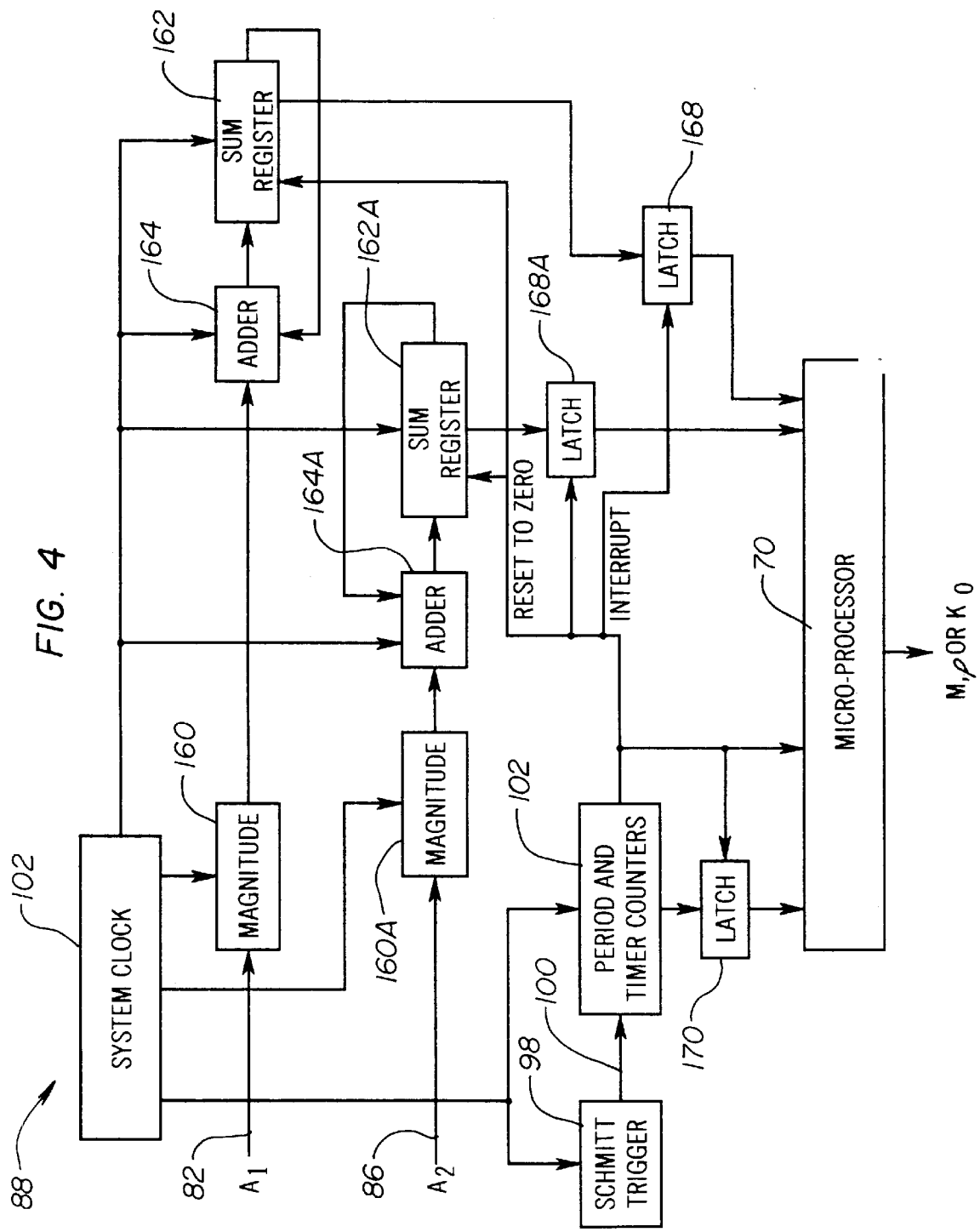
FIG. 4 is a block diagram of a circuit used to calculate mass flow in accordance with the present invention.

FIG. 4 illustrates one technique for obtaining the values $\Sigma A_1$ and $\Sigma A_2$ of Equation 11. The filtered output signal 82 is provided to a magnitude generator 160 where all the negative numbers are made positive and the positive numbers are left positive thereby effectively rectifying the signal to generate a magnitude signal. The magnitude generator 160 provides a magnitude signal to an adding circuit 164. The adding circuit 164 sums the magnitude value with the content of a sum register 162 and places the resulting sum in register 162. The period timer and period counter 102 effectively counts periods in the first filtered output signal 82 based upon the signal from the Schmitt trigger 98 and issues an interrupt at an end of the "averaging period" that latches the value in sum register 162 into a latch 168. Magnitude generator 160A, sum register 162A, adding circuit 164 and latch 168A process the second filtered output signal 86 similarly.

The value of the period timer and period counter 102 (the length of the "averaging") is provided into latch 170. The "averaging period" is the time required for the Schmitt trigger 98 to output at least one or an integer number of cycles that exceeds 0.1 seconds, which is the update rate of the microprocessor 70. The update of the microprocessor 70 is the rate at which the microprocessor 70 updates the mass flow calculation. The interrupt also resets sum registers 162 and 162A to zero for the next summation period. This interrupt also signals microprocessor 70 to retrieve values in latches 168 and 168A, and latch 170. The timing of all these operations is synchronized by the system clock 101. At the interrupt, the latches 168 and 168A contain values representative of the following equations:

$$\Sigma|A_1| \text{ and } \Sigma|A_2| \qquad \text{EQU. 14}$$

The microprocessor 70 then calculates an output signal related to fluid flow from the Equations 11–13 as described above. Referring back to FIG. 1, the microprocessor 70 provides the desired output value to a digital-analog converter 83 for converting the digital value to a 4–20 mA current representative of the flow. A digital communication circuit also can receive the final output value for transmission on the current loop 17 using known formats. If desired, a generator 87 can also receive the value of mass flow and through an isolator 89 provide a frequency output $F_{out}$ from a pulse circuit 95. A display 73 provides a user interface for the vortex flowmeter 10.

Although the present invention has been described with reference to preferred embodiments, workers skilled in the art will recognize that changes may be made in form and detail without departing from the spirit and scope of the invention.

What is claimed is:

1. A vortex flowmeter sensing a pressure of vortices in a flowing fluid and transmitting an output related to mass flow, the vortex flowmeter comprising:

a dynamic filter filtering a vortex pressure signal and providing a first filtered output signal and a second filtered output signal which tracks the first filtered output signal, the dynamic filter having a controllable transfer function;

control circuitry controlling the controllable transfer function and providing an output related to mass flow as a function of the first filtered output signal and the second filtered output signal; and transmitter circuitry receiving the output signal and transmitting a signal related to mass flow.

2. The vortex flowmeter of claim 1 wherein the dynamic filter comprises:

a first filtering circuit for receiving the vortex pressure signal; and a second filtering circuit for receiving the first filtered output signal and providing the second filtered output signal.

3. The vortex flowmeter of claim 2 wherein the first filtering circuit has a first controllable transfer function and the second filtering circuit has a second controllable transfer function.

4. The vortex flowmeter of claim 3 wherein the first controllable transfer function is approximately identical to the second controllable transfer function.

5. A method for calculating an output related to flow rate from a vortex signal indicative of vortices generated in a fluid, the method comprising the steps of:

(a) filtering the vortex signal to provide a first filtered output signal;

(b) filtering the first filtered output signal to provide a second filtered output signal; (c) controlling the filtering in step (b) in accordance with the filtering in step (a); and (d) calculating the output related rate as a function of the first filtered output signal and the second filtered output signal.

6. The method of claim 5 wherein step (a) comprises filtering with a first controllable transfer function, and step (b) comprises filtering with a second controllable transfer function, wherein the first controllable transfer function and the second controllable transfer function have a known relationship, and the method further includes adjusting the first and second controllable transfer functions.

7. The method of claim 6 wherein the first controllable transfer function is approximately identical to the second controllable transfer function.

8. The method of claim 5 and further comprising amplifying the first filtered output signal prior to step (b).

9. A vortex flowmeter for providing an output value representative of a flow rate of a flowing fluid, the vortex flowmeter comprising:

a vortex generator positionable in the path of fluid flow to generate vortices;

a vortex sensor for sensing the generated vortices and providing a vortex signal;

a first filtering circuit for receiving the vortex signal and providing a first filtered output signal, the first filtering circuit having a first transfer function;

a second filtering circuit for receiving the first filtered output signal and providing a second filtered output signal, the second filtering circuit having a second transfer function, wherein the second transfer function tracks the first transfer function; and a processing circuit receiving the first filtered output signal and the second filtering output signal, the processing circuit calculating the output value as a function of the first filtered output signal and the second filtered output signal.

10. The vortex flowmeter of claim 9 wherein the first and second filtering circuits each include an adjustable filter parameter.

11. The vortex flowmeter of claim 10 wherein the processing circuit provides a control signal to the first and second filtering circuits to adjust the adjustable filter parameter.

12. The vortex flowmeter of claim 9 wherein the first and second filtering circuits each comprise a plurality of cascaded filters.

13. The vortex flowmeter of claim 12 wherein the first and second filtering circuits each comprise a low pass filter and a high pass filter.

14. The vortex flowmeter of claim 9 and an amplifier for receiving and amplifying the first filtered output signal.

15. The vortex flowmeter of claim 9 wherein the first transfer function and the second transfer function are approximately equal.

16. The vortex flowmeter of claim 9 wherein the output value is a mass flow rate.

\* \* \* \* \*